3,071,518
METHOD OF INCREASING METABOLIC PRODUCT YIELD OF ORGANISMS
George H. Scherr, Park Forest, and Max E. Rafelson, Jr., Oak Park, Ill., assignors to Consolidated Laboratories, Inc., Chicago Heights, Ill., a corporation of Illinois
No Drawing. Filed Feb. 9, 1960, Ser. No. 7,540
14 Claims. (Cl. 195—78)

This invention relates to the yield of metabolic products of organisms and has particular relation to a method of detecting and isolating mutants or variants having the property of synthesizing certain substances in greater amounts than that possible by the parent strain.

It is well known that living organisms have varied nutritional requirements needed to produce growth, function, metabolic and physiological activity of the organism. The substances that would satisfy such nutritional requirements may be vitamins, amino acids, and various other substances, organic or inorganic. Nutritional requirements are here considered as all those substances, organic or inorganic, which are required by the organism for growth, function, metabolic and physiological activity. Such essential requirements may be met by the ability of the organism to synthesize these essential requirements from the constituents of a medium or by supplying such requirements per se in a medium. When the essential substances can be synthesized by the organism from components of the medium, such essential substances are usually said to be dispensable. When such essential substances must be provided in the medium per se, they are usually said to be nondispensable.

For example, the microorganism *Escherichia coli* can be grown in a synthetic medium composed of inorganic salts and glucose. Growing in such a medium the cells of *E. coli* synthesize amino acids, vitamins and in fact all of the necessary proteins, carbohydrates, and other compounds and substances essential for their viability, cell multiplication and physiological activity. The microorganism *Lactobacillus casei* will not grow in the medium indicated above unless certain essential substances are supplied in the medium, such as folic acid. It is in fact precisely this requirement which makes it possible to utilize *L. casei* in the bioassay for folic acid. Other organisms having other specific requirements can similarly be used in bioassay methods (Barton-Wright, E.C., Microbiological Assay of the Vitamin B Complex and Amino Acids, Pitman Publishing Corporation, New York, 1952).

It is also known that the essential substances, referred to here as metabolites, are essential because they participate in essential biochemical reactions carried out in and by the cell. These facts and concepts are ably discussed in detail in such publications as: Beadle, G. W., Harvey Lectures, 1944–45, 40: 179; B. D. Davis, Biochemical Explorations With Bacterial Mutants, The Harvey Lectures, Series L, 1954–1955, page 230.

Certain substances, oftentimes similar in molecular structure to the metabolites, can act to interfere with the normal utilization of the metabolites and consequently cause the cessation of metabolic activity and/or cell multiplication. Such substances are called anti-metabolites. Details and concepts of their action may be found in such publications as: D. W. Woolley, A Study of Antimetabolites, John Wiley & Sons, New York, 1952; Robert E. Parks, Jr., Antimetabolite Studies in Tetrahymena and Tumors, from Antimetabolites and Cancer, Ed. C. P. Rhoads, A.A.A.S., Washington, D.C., 1955, page 175.

The interference with essential metabolic pathways by antimetabolites is possible whether the metabolite is synthesized by the cells from other compounds or is a requirement which must be supplied per set to the culture medium. In general, however, the amount of antimetabolite necessary to inhibit in the former instance is greater than required in the latter.

This application is a continuation-in-part of our application Serial Number 662,004, filed May 28, 1957, and entitled "Method of Increasing Metabolic Product Yield of Organisms."

The characteristic of organisms having specific requirements for essential metabolites is essentially a genetic trait. Thus, under usual conditions of cell growth and multiplication the progeny of cells that have a specific requirement for some chemical agent will also have this same requirement. These stable traits are similar to others such as fermentation characteristics, antibiotic resistance, and susceptibility to bacteriophage which, because of their genetic stability, can be used as identifying criteria for various strains and species of organisms.

The stability of generic characteristics and their transfer from one generation to the next is occasionally marred by the occurrence of a mutant or variant which differs in some characteristic trait(s) from the parent cell from which it was derived. The significant feature of a mutant is that this altered trait is stable and is transferred thereafter to the succeeding generations as was the original trait from which it differs.

The phenomenon of the occurrence of mutants in a population of organisms has certain features pertinent to this invention. In general it can be said that any particular mutant occurs with some element of probability, and this probable rate of occurrence or statistical incidence is a function of the particular mutant character and the environment in which the culture is grown or exposed.

In order to isolate a mutant from a microbial population, large numbers of organisms usually need be examined. Where the mutant character is such that it alone can survive under selected cultural conditions and the multiplication of the parent type is suppressed, then the ease of isolating the mutant character increases markedly. Such would be the case, for example, in the isolation of bacteriophage-resistant mutants, or antibiotic-resistant mutants.

Details of some of the methods applicable for the isolation of mutants are discussed in such publications as—Braun, W., Bacterial Genetics, W. B. Saunders Co., Philadelphia, 1953; Cold Spring Harbor Symposia on Quantitative Biology, vol. XI, 1946, Cold Spring Harbor, L.I., N.Y.

The techniques hitherto reported for the isolation of mutants were not designed for the isolation of mutants wherein their selection from a population of organisms is made feasible because of their increased yield of a specific metabolic product.

We have found that employment of an antimetabolite effective to interfere with the growth and multiplication of an organism due to specific interference by the antimetabolite with an essential biochemical reaction involving a specific metabolite can lead to the isolation of organisms in such a culture able to overcome the effect of the antimetabolite and multiply and thus to a mutant synthesizing a greater concentration of the metabolite than that synthesized by the parent culture.

The exposure of a culture to an antimetabolite may result in the appearance of strains resistant to the inhibitory effects of the antimetabolite for reasons in addition to and independent of the capacity of such strains to synthesize an increased amount of the metabolite as compared to the parent strain. For example, it is conceivable that in a population of microorganisms subjected to an antimetabolite, there may appear mutants or variants which are resistant to the antimetabolite for reasons of alterations in permeability of the cell wall and/or cell membranes which can restrict the entrance of the antimetabolite into the cell. It is also conceivable that some mutant or variant may be capable of utilizing the antimetabolite as a source of carbon or in some similar fashion as a source of nutrition. It is also possible that the antimetabolite may be contaminated with the metabolite or related substances utilizable by the organism. These causes may be concommitant with or independent of an ability of the variant or mutant to synthesize or produce an increased amount of metabolic product without interference in or obstacle to the inventive method herein described.

The invention herein includes a method of isolating those mutants or variants whose ability to grow and multiply in the presence of some antimetabolite results from the ability of these mutants to produce an increased amount of specific metabolic product.

Numerous experiments have been performed in testing and demonstrating the practicability of the invention herein described:

EXAMPLE I

*Isolation of a Mutant Strain of* Escherichia coli *Having a Higher Yield of Nicotinic Acid, Nicotinamide, and/or Nicotinuric Acid*

An agar medium containing inorganic basal salts, biotin, and glucose, referred to here as the basal medium, was prepared by conventional laboratory methods and the lower edge of a gradient plate was poured using such a medium. This "gradient plate method" is essentially the same as that described by Szybalski, Science, 116: 46–48, 1952.

The upper layer of the gradient plate consisted of the basal medium plus a suitable amount of pyridine-3-sulfonic acid such as a .01 molar concentration. Pyridine-3-sulfonic acid is an antimetabolite of nicotinic acid and this specific activity has previously been demonstrated and described in the literature (Woolley, supra).

The bottom layer of the gradient plate contained merely the basal medium. A heavy inoculum of *E. coli* strain B/r was streaked over the surface of the medium and suitably incubated to produce growth of the organism. At some position across the gradient plate there will be a concentration of the antimetabolite pyridine-3-sulfonic acid inhibitory to the bacteria inoculated thereon. The confluent growth of the bacteria is found from the lower concentration of antimetabolite up to the point of inhibiting concentration of pyridine-3-sulfonic acid. Beyond this position on the plate, all growth is inhibited except for any mutants present in the culture which have the ability of multiplying in the presence of concentrations of the antimetabolite inhibitory to the parent culture. Mutant colonies thus isolated may then be subcultured a number of times using the basal medium free of pyridine-3-sulfonic acid and then retested by the gradient plate method described above in order to insure that the characteristic of resistance to the antimetabolite was a stable one and not a temporary alteration which might revert in the absence of the antimetabolite.

The parent culture of *E. coli* B/r (ATCC 12407, N12–17) was transferred to a slant of basal medium where excellent growth resulted after four days at 37° C. incubation. From this transplant a gradient plate containing basal medium including .01 M pyridine-3-sulfonic acid was streaked and incubated at 37° C. for five days. Confluent growth of this gradient plate culture was found for approximately half the diameter of the gradient plate. In the zone of no growth, which represents the inhibiting effect of the pyridine-3-sulfonic acid at the concentration in that section of the gradient plate, a few colonies had formed which were regarded as mutants resistant to that concentration of pyridine-3-sulfonic acid inhibitory to the parent culture *E. coli* B/r. One of those presumable mutants was transferred to a slant of basal agar in a tube and grew very well in this medium. This culture, designated No. 5–218D, was then restreaked on the surface of another gradient plate containing the basal medium with .01 M pyridine-3-sulfonic acid and after a suitable incubation period confluent growth of the culture was found over the entire surface of the plate. The culture 5–218D was then serially transferred a few times onto slants of basal medium, finally inoculated into 1 liter of basal salts liquid media, and incubated at 37° C. The cells were harvested by centrifugation at 0° C. for 30 minutes at 2000 r.p.m. and both the cells and supernatant were separately assayed for nicotinic acid.

In order to compare the nicotinic acid assay on the isolate No. 5–218D with the parent or wild-type culture and also to determine the degree of variation of such an assay when performed on subcultures or clone isolates of the parent culture B/r the following experiment was performed:

The culture of *E. coli* B/r was streaked out onto a basal agar medium free of the antimetabolite and incubated at 37° C. for approximately 96 hours. Three isolate colonies from this culture were transferred to slants containing the basal solid medium and these three isolates were designated by the code letters 5–211W, 5–211X, and 5–211Y. These three isolates were then treated in a similar manner. They were inoculated into flasks containing 1000 ml. of liquid basal medium and incubated at 37° C. for approximately eight days. The cells were harvested by centrifugation at 0° C. for 30 minutes at 2000 r.p.m. and both the cells and supernatant were separately assayed for nicotinic acid.

The microbiological assay procedure used was essentially that referred to above (E. C. Barton-Wright, supra). The organism used was *Lactobacillus arabinosus* which responds to nicotinic acid, nicotinamide and/or nicotinuric acid as growth factors.

Appropriate dry samples of the *E. coli* cells were extracted for 16 hours with petroleum ether to extract any lipides which might interfere with extraction. The extracted material (usually about 2 gm.) was suspended in 20 ml. of 1 N hydrochloric acid and hydrolyzed by autoclaving for 20 minutes at 15 pounds pressure. After cooling, 2.0 ml. of 1 N sodium acetate solution was added and the pH adjusted to 4.5 with sodium hydroxide solution and made up to an appropriate volume. The solution was filtered and an aliquot adjusted to pH 6.8 and made up to an appropriate volume for assay.

The standard curves obtained on the basal medium showed a linear portion and the results were calculated by the slope-ratio method.

ASSAY FOR NICOTINIC ACID, NICOTINAMIDE, AND/OR NICOTINURIC ACID

| Code No. of organism: | μg./gm.[1] |
| --- | --- |
| 5–211W | 68.8 |
| 5–211X | 65.1 |
| 5–211Y | 75.1 |
| 5–218D | 265 |

[1] Dry weight cells (each value represents the mean for six separate determinations).

It is clear from these data that the culture 5–218D is a stable variant showing a valid alteration and increase in production of nicotinic acid or derivatives of nicotinic acid. In order to negate the possibility that contamination with organisms other than *E. coli* might explain the differences between the strain 5–218D and the three isolates 5–211W, 5–211X, and 5–211Y, a number of accepted identifying experiments were made with the findings that isolates 5–218D, 5–211W, 5–211X, 5–211Y and the original culture *E. coli* B/r, from which these isolates were derived, all were found to yield "IMViC" reactions of ++−−, ferment lactose with the production of acid and gas in 24 hours at 37° C., were Gram negative, and gave characteristic colonial morphology on EMB agar.

Another technique, designated the "serial dilution method," that may be used for the isolation of the mutants constituting an object of the invention described herein would be as follows: Using the liquid basal medium described above, cultures of E. coli B/r are grown to yield a final population of approximately $10^{10}$ cells. These cells, concentrated by centrifugation and washed with sterile saline, using conventional laboratory methods, may be inoculated directly into fresh liquid basal media containing a concentration (e.g. .01 M) of the antimetabolite pyridine-3-sulfonic acid suitable for the inhibition of growth of the parent culture.

In such a medium those mutants or variants will grow and multiply which can synthesize a quantity of nicotinic acid of sufficient concentration to overcome the effect of the pyridine-3-sulfonic acid, while the parent population will not. After a suitable incubation period, e.g., 3 days at 37° C., an aliquot such as 1 ml. is transferred aseptically to a fresh flask of basal liquid medium containing the same concentration of pyridine-3-sulfonic acid. Again, only growth of the mutants or variants continue. This procedure may be repeated a number of times so that subsequently the only cells subcultured to fresh media are the mutant or multiplying ones and the non-multiplying parent culture, which may or may not be dead, will be diluted out by this method of serial subculture.

EXAMPLE II

*Isolation of a Mutant Strain of Yeast (Derived From Saccharomyces microsporus NRRL Y–1550) Having a Higher Pyridoxine Yield Than Parent Culture*

Slants of *S. microsporus* NRRL Y–1550 were maintained on agar slants using the following medium which we shall arbitrarily designate as medium A.

"MEDIUM A"

| | | |
|---|---|---|
| $(NH_4)_2SO_4$ | gms | 0.75 |
| $K_2HPO_4$ | gms | 0.75 |
| $KH_2PO_4$ | gms | 0.75 |
| $MgSO_4.7H_2O$ | gms | 0.30 |
| NaCl | gms | 0.015 |
| $FeSO_4.7H_2O$ | gm | 0.01 |
| $MnSO_4.2H_2O$ | gm | 0.0065 |
| Glucose | gms | 1.5 |
| Biotin | μgm./ml | 0.1 |
| Dist $H_2O$ | ml | 150 |
| Agar-agar | percent | 1.5 |

Cells from a 48 hour slant culture of *S. microsporus* NRRL Y–1550 were suspended in sterile buffered saline ($NaH_2PO_4$—0.57 gm.; $Na_2HPO_4$—2.5 gms.; NaCl—8.5 gms.; distilled water—1000 ml.) and inoculated onto a gradient plate prepared as described above with medium "A" and in which the upper layer of the gradient plate contained 2 grams per 100 ml. of medium of isoniazid. Pyridoxal has been shown to be an antagonistic to isoniazid (Pope, Amer. Rev. Tuberculosis, 68: 938, 1953; ibid. 73: 735, 1956).

Following incubation for approximately 2 days at 26° C. an area of growth, 35 mm. long was found to extend across the gradient plate. Within the area where overall growth was inhibited, isolated colonies could be found which were resistant to the inhibiting effect of the isoniazid. A number of these colonies were picked and transferred to agar slant cultures (medium "A" above) and incubated at 26° C. for 2 days. One of these cultures was designated *Saccharomyces microsporus* 6–191I. This mutant culture was replated in a manner similar to that described above, on a gradient plate containing 2 grams per 100 ml. of isoniazid in the upper portion of the gradient plate. Following incubation, this plate now showed an area of growth of 81 mm. across the gradient indicating that the 6–191I mutant was able to grow on the medium containing a higher concentration of the inhibitor than was possible by its parent *Saccharomyces microsporus* NRRL Y–1550.

Cells from a 48 hour agar slant culture of *Saccharomyces microsporus* NRRL Y–1550 were suspended in sterile buffered saline, centrifuged and again resuspended in 10 ml. of sterile buffered saline. One ml. of the suspension was added to each of three 250 ml. Erlenmeyer flasks containing 50 ml. of pyridoxine-free basal single strength medium; cells from a 48 hour culture of *S. microsporus* 6–191I were similarly treated.

The composition of this medium was the same as that given for the pyridoxine assay (Methods of Vitamin Assay, Association of Vitamin Chemists, Interscience Publishers, second edition, reagent 32, p. 222), with the exception that the glucose content was reduced to 3.0% and the pH adjusted to 6.0.

Six flasks in all were prepared, three represented the parent yeast and three the mutant:

| Cultures | Code No. of shake flask cultures |
|---|---|
| *S. microsporus* NRRL Y–1550 (parent) | 26–19A<br>26–19B<br>26–19C |
| *S. microsporus* 6–191I (mutant) | 26–19D<br>26–19E<br>26–19F |

The cultures were incubated at 26° C. on a model #10 New Brunswick gyratory shaker at 250 revolutions per minute. At the end of four days the cultures 26–19A and 26–19D were removed for pyridoxine and dry cell determinations. Cultures 26–19B, C, E and F were removed at the end of seven days. At the end of each incubation period sufficient distilled water was added to each culture to bring it back to the original volume, the suspension was thoroughly mixed and 5.0 ml. was removed, autoclaved at 121° C. for 5 minutes, cooled and centrifuged. Aliquots of the supernatants were assayed for pyridoxine in duplicate at two levels by the microbiological method using *Saccharomyces carlsbergensis* NRRL Y–1089 (Method of Vitamin Assay, Association of Vitamin Chemists, Interscience Publishers, New York, 2nd edition, 1951), with the following changes:

(1) The assay was carried out in 125 ml. Erlenmeyer flasks instead of test tubes.

(2) The flasks were shaken for 18 hours on a model #10 Brunswick gyratory shaker at 250 revolutions per minute.

The 45 ml. of culture remaining in each flask after removal of the aliquot for pyridoxine assay was centrifuged, the cell pellet washed once with sterile buffered-saline, recentrifuged and the residue transferred to tared weighing dishes. The cells were then dried overnight at 105° C., cooled in a desiccator over anhydrous $CaCl_2$ for one hour, and then weighed. The following Table 1 shows the millimicrograms of pyridoxine secreted into the medium, the dried weight of cells produced and the millimicrograms of pyridoxine obtained per mg. of dried cells produced by the culture.

Table 1 shows that there was a slight increase in the amount of pyridoxine per mg. of dried cells between the 4th and 7th day of incubation. The significant point here is the large difference in yield in pyridoxine between the mutant *S. microsporus* 6–191I and the parent culture from which it was derived.

It is also significant to note that the ability of this mutant to secrete pyridoxine does not depend upon its being grown on or in a medium containing the inhibitor which made possible its isolation. In addition, it is significant to note that the mutant characteristic is a stable genetic one in that reexamination of *S. microsporus* 6–191I as long as 1 year after its isolation, during which time it had been kept on a medium completely free of isoniazid, still showed the higher concentration of pyridoxine over that of the parent.

TABLE 1

| Culture | Age (Days) | Pyridoxine/ml. of culture supernatant (millimicrograms) | Mean | Weight dried cells (mg./ml. of culture) | Pyridoxine (millimicrograms mg. dried cells) |
|---|---|---|---|---|---|
| 26-19A (parent) | 4 | 404.0<br>402.0<br>405.0<br>408.0 | 404.7 | 9.24 | 43.79 |
| 26-19D (mutant) | 4 | 2900.0<br>2600.0<br>2750.0<br>2750.0 | 2,750.0 | 8.54 | 320.0 |
| 26-19B (parent) | 7 | 380.0<br>380.0<br>340.0<br>360.0 | 365.0 | 7.10 | 51.4 |
| 26-19C (parent) | 7 | 380.0<br>376.0<br>370.9<br>390.0 | 379.2 | 8.66 | 43.8 |
|  |  |  | 372.1 | 7.88 | 47.6 |
| 26-19E (mutant) | 7 | 2900.0<br>2900.0<br>2650.0 | 2,816.6 | 7.49 | 375.9 |
| 26-19F (mutant) | 7 | 2900.0<br>2880.0<br>2650.0<br>3000.0 | 2,857.5 | 7.56 | 377.9 |
|  |  |  | 2,837.1 | 7.52 | 376.9 |

EXAMPLE III

*Isolation of a Mutant Strain of* Escherichia coli *Having a Higher Thiamine Yield Than Parent Culture*

*Escherichia coli* B/r (ATCC 12407, N12–17) was transferred twice onto agar slants of the following composition which we have arbitrarily designated as medium "B."

MEDIUM "B"

Ingredients per liter: Gms.
- Glucose _____ 4.0
- $KH_2PO_4$ _____ 3.0
- $NH_4Cl$ _____ 1.0
- $Na_2HPO_4 \cdot 12H_2O$ _____ 15.0
- NaCl _____ 0.5
- $MgSO_4$ _____ 0.2
- Agar-agar _____ 15

After the second transfer the culture was then used to inoculate a wide mouth 500 ml. Erlenmeyer flask containing 50 ml. of medium "B" to which had been added 0.2% of yeast extract. The culture was then incubated at 37° C. on a New Brunswick gyratory shaker model S–3 at 250 revolutions per minute for 48 hours. At the end of this time 25 ml. of the culture was centrifuged and washed once with sterile saline buffered with phosphate to pH 7.0.

PHOSPHATE BUFFERED SALINE, pH 7.0:
- $NaH_2PO_4$ _____gms__ 0.57
- $Na_2HPO_4$ _____gms__ 2.5
- NaCl _____gms__ 8.5
- Distilled water _____ml__ 1000

The cells were then resuspended in 4.0 ml. of a medium we have designated as an "irradiation" medium.

"Irradiation" medium:
- Adenine sulfate _____mg__ 1.0
- Cytosine _____mg__ 1.0
- Guanine HCl _____mg__ 1.0
- Thymine _____mg__ 1.0
- Uracil _____mg__ 1.0
- Yeast extract _____mg__ 200
- Distilled water _____ml__ 100

The "irradiation" medium was sterilized in the autoclave for 15 minutes at 15 lbs. steam pressure. 2.4 ml. of the suspension of cells in the "irradiation" medium was placed into a 125 ml. round bottom quartz flask and exposed to ultraviolet from an eight watt germicidal lamp for five minutes at a distance of six inches. During the course of the irradiation the flask was slowly rotated. Following irradiation the contents of the quartz flask was transferred to 250 ml. Erlenmeyer flask containing 25 ml. of medium which we have designated medium "C."

MEDIUM "C"

- Glucose _____percent__ 1.0
- Enzymatic digest of casein _____do____ 2.0
- Pyrithiamine HBr _____μgm./ml__ 3
- Distilled water _____ml__ 100

This cell suspension in medium "C" was placed on the shaker at 37° C. and exposed for 25 minutes to the light from two General Electric photoflood lamps with intensity of approximately 45 foot candles as measured on a G.E. exposure meter type DW 68 with the cover closed. The lights were then turned off and the shaking continued for another two hours. The culture was then centrifuged, washed one with sterile buffered saline and resuspended in 10 ml. of sterile buffered saline. One ml. of this cell suspension was then spread evenly over the surface of a gradient plate containing two layers of medium "B" with the upper layer containing the agar medium "B" containing 50 micrograms of pyrithiamine HBr per ml. of medium.

The inoculated gradient plate was then incubated at 37° C. for 48 hours. At this time heavy growth appeared at the end of the plate where the concentration of the inhibitor (pyrithiamine HBr) was the lowest. The density of growth gradually diminished toward the opposite end of the plate, and at the extreme end, where the concentration of the inhibitor was the greatest, isolated clones appeared which were considered to be mutants. A number of these clones were transferred to agar slants of medium "B." These cultures were incubated at 37° C. for 48 hours and then a number of them were selected for further analysis in order to determine their ability to produce an amount of thiamine greater than that of the parent from which they were derived. 50 ml. of medium "B" (minus the agar-agar) contained in wide mouth 500 Erlenmeyer flasks were inoculated in duplicate with the parent and presumable mutants. These shake flask cultures were incubated at 37° C. for 48 hours on the New Brunswick gyratory shaker at 250 r.p.m. The cells were then removed by centrifugation, washed, lyophilized, and a weighed sample taken for analysis. The preparation of the sample and the assay was carried out as described in Methods of Vitamin Assay, second edition, 1951, pp. 111–123, Interscience Publ., New York. The following outlines the essential features of the methods used:

(1) Sample autoclaved for 15 minutes at 15 lbs. with 50 ml of 0.1 N HCl.
(2) Extract cooled and filtered and 5 ml. of a thiamine-free phosphatase added. Incubated at 45° for 3 hours at pH 4.5.
(3) Extract cooled and filtered. Extract adjusted to pH 3.5 and passed through column as described in the reference above. Column washed with three, 30 ml. portions of water at 70° C. Column eluted with 50 ml. of acidified KCl solution.
(4) Aliquot of acidified KCl eluate converted to thiochrome as described in above reference.
(5) Thiochrome extracted and fluorescence measured in a Coleman Model 12–A Photoflurometer.

The following data were obtained from 12 shake flasks representing the parent and five mutants:

TABLE 2

| Culture | E. coli B/r code No. | Micrograms of thiamine per gram of dried cells (done in duplicate) | Mean |
|---|---|---|---|
| Parent | ATCC 12407, N12-17 | 16.2<br>17.0 | 16.6 |
| Mutants | 29-296A | 43.6<br>50.2 | 46.9 |
| | 29-296B | 20.3<br>18.9 | 19.6 |
| | 29-296C | 52.7<br>56.4 | 54.5 |
| | 29-296D | 33.9<br>29.8 | 31.8 |
| | 29-296G | 40.5<br>38.3 | 39.4 |

Standard thiamine solution treated in the same manner as the samples gave the following values.

TABLE 3

| Micrograms standard used: | Value obtained |
|---|---|
| 10.0 | 9.7 |
| 10.0 | 10.1 |
| 20.0 | 19.8 |
| 20.0 | 19.5 |
| 40.0 | 41.2 |
| 40.0 | 39.4 |

First sample from culture *E. coli* B/r 29–296C (52.7 μgm./gm.) + 20 μgm. added thiamine __ 74.6

It is clear from the data in Table 2 that four of the five mutant cultures investigated (29–296A, 29–296C, 29–296D, and 29–296G) showed, as compared to the parent strain from which they were derived, a significant increase in the production of thiamine and/or thiamine derivates. The increase ranged from 91 to 227%, considerably greater than the variability of the analytical procedure which was about ±3% (Table 3) and the variability between duplicate shake-flask cultures which ranged from about ±5 to ±15%.

Where the metabolite of interest is a final product, as is true in penicillin production by *Penicillium chrysogenum* or the fermentation by *Rhizopus nigricans* to fumaric acid, for example, these final products are in themselves not essential to the organisms from whose culture they are isolated. Consequently, exposing a culture of *P. chrysogenum* to an inhibitor of penicillin, for example, will have little direct effect on the viability of the organism. However, the biochemical or physiological precursors to a final product, though themselves not final products, are often essential to the organisms. The invention herein described encompasses subjecting a culture to an optimum concentration of an antimetabolite specific for a precursor to a final product to inhibit the growth and multiplication of the organism thus exposed and to facilitate growth of only those mutants or variants present in the parent population and having the capacity for increased yield of the specific precursor. It follows from this that the increased amount of the specific precursor would increase the potential for an increased yield of the final product desired.

Although the supportive experimental data here submitted was performed with microorganisms, it is clear that organisms other than microbial may be utilized within the scope of this invention. Thus, any organism that can be cultivated in relatively large numbers and grown under controlled conditions would be amenable to the methods of and within the scope of the invention herein described.

Although two laboratory techniques, the serial dilution and gradient plate, are herein described as suitable for employment in performing certain steps of the inventive method disclosed, it is clear that numerous other laboratory procedures and techniques may be used in performing these and other steps without deviating from the nature, scope and novelty of the invention herein described.

Although the specific inhibitory substances herein discussed are described as antimetabolites, it is clear that metabolic inhibitors which are not strictly speaking antimetabolites may be useable within the scope of the invention herein described.

We claim:

1. A method for obtaining increased amounts of metabolic product produced in normal amounts by a microorganism which includes the steps of placing a population of said microorganism in a cultural environment, contacting said microorganism with an antimetabolite specifically effective to inhibit production of said metabolic product, said population developing mutant colonies in response to the presence of the antimetabolite, growing said mutants in a culture medium without the antimetabolite, and obtaining therein the increased amounts of metabolic product.

2. The method of claim 1 further characterized in that the antimetabolite inhibits a precursor of the metabolic product.

3. The method of claim 1 further characterized in that the antimetabolite inhibits formation of the metabolic product by said microorganism.

4. A method according to claim 1 wherein the metabolic product is essential to the microorganism.

5. The method according to claim 1 wherein the metabolic product is not essential to the microorganism.

6. A method according to claim 1 further characterized in that the microorganism is *Escherichia coli*, and the metabolic product is a member of the vitamin B group.

7. A method according to claim 1 wherein the microorganism is *Saccharomyces microsporus* and the metabolic product is a member of the vitamin B group.

8. A method according to claim 1 wherein the microorganism is *Penicillum chrysogenum* and the metabolic product is penicillin.

9. A method according to claim 1 wherein the microorganism is *Rhizopus nigricans* and the metabolic product is fumaric acid.

10. A method for obtaining increased amounts of metabolic product produced in normal amounts by a microorganism which includes the steps of placing a population of said microorganism in a culture environment, contacting said microorganism with an antimetabolite specifically effective to inhibit formation of said metabolic product, said population developing mutant colonies in response to the antimetabolite, transferring said mutants to a second culture medium, repeating the transfer to culture media containing the antimetabolite, growing said mutants in a culture medium without the antimetabolite, and obtaining therein the increased amount of metabolic product.

11. A method for obtaining increased amounts of metabolic product produced in normal amounts by a microorganism which includes the steps of placing a population of said microorganism in a culture environment, contacting said microorganism with gradient levels of an antimetabolite specifically effective to inhibit formation of said metabolic product by said microorganism, said population developing mutant colonies in response to the presence of the antimetabolite, growing the mutants in a culture medium without the antimetabolite, and obtaining therein the increased amounts of metabolic product.

12. A method for obtaining increased amounts of metabolic product produced in normal amounts by a microorganism which includes the steps of placing a population of said microorganism in a culture environment, contacting said microorganism with gradient levels of an antimetabolite specifically effective to inhibit formation of a precursor of said metabolic product, said population developing mutant colonies in response to the presence of the antimetabolite, growing said mutants in a culture medium without the antimetabolite, and obtaining therein the increased amounts of metabolic product.

13. A method for obtaining increased amounts of metabolic product produced in normal amounts by an original microorganism population which includes the steps of placing the original population of said microorganism in a culture environment, contacting said original population with an antimetabolite specifically effective to inhibit formation of the metabolic product, said original population developing mutant colonies in response to the presence of the antimetabolite, separating the growing mutant colonies from the non-growing original population in the presence of the antimetabolite, transferring the separated mutant colonies to a sequence of culture mediums containing said antimetabolite to further separate the growing mutant colonies from the non-growing parent population, growing said mutant microorganisms in a final culture medium without the antimetabolite, and obtaining therein the increased amounts of metabolic product.

14. A method for obtaining increased amounts of metabolic product produced in normal amounts by a microorganism which includes the steps of placing a population of said microorganism in a culture environment, contacting said microorganism with an antimetabolite specifically effective to inhibit production of said metabolic product, said population developing mutant colonies in response to the presence of the antimetabolite, transferring said mutants to another culture medium containing the antimetabolite, growing said mutants in a culture medium without the antimetabolite, and obtaining therein the increased amounts of metabolic product.

References Cited in the file of this patent

UNITED STATES PATENTS

| | | |
|---|---|---|
| 2,230,130 | Bucherer | Jan. 28, 1941 |
| 2,571,115 | Davis | Oct. 16, 1951 |
| 2,796,382 | Talalay | June 18, 1957 |

OTHER REFERENCES

Chandler et al.: Proceedings of the Society for Experimental Biology and Medicine, vol. 40, No. 2, February 1939, pages 179–184, page 180 relied on.

Woods: "Biochemical Significance of the Competition Between p-Aminobenzoil Acid and the Sulfonamides," Annals of N.Y. Acad. Sci., vol. 52, July 7, 1950, pages 1199–1211.

"Physiology of the Fungi," by Lilly and Barnett, 1951, published by the Maple Press Co., York, Pa., pages 226–240.

Davis: J. Bact., vol. 64, No. 5, 1952, pages 729–748.

"Basic Bacteriology and Its Biological and Chemical Background," by La Manna and Mallette, 1953, published by Williams & Wilkins Co., Baltimore, Md., pages 628–630.

"Production of Bacteriophage Mutants by a Disturbance of Deoxyribonucleic Acid Metabolism," by Litman and Pardee, Nature, vol. 178, September 1956, pages 529–531.

"Bacterial Mutation Induced by Thymine Starvation," by Coughlin and Adelberg, Nature, vol. 178, September 1956, pages 531–532.